Sept. 3, 1929.  G. J. FAYETTE ET AL  1,726,659
LINK SHACKLE
Filed Aug. 8, 1928
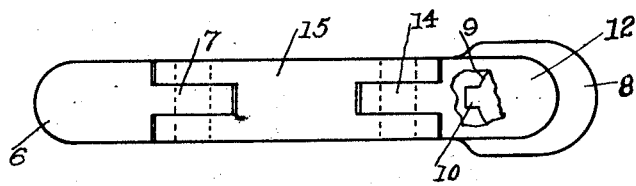
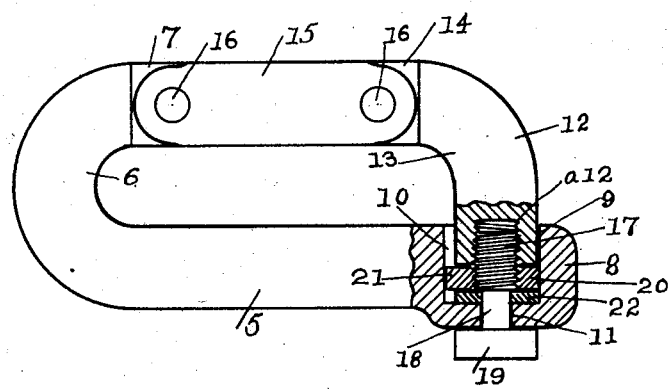
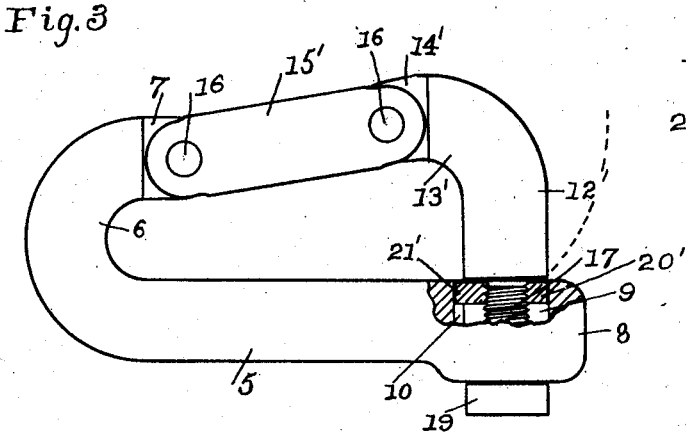
George J. Fayette and
James S. Rolph,
INVENTORS.
BY David E. Lain,
ATTORNEY.

Patented Sept. 3, 1929.

1,726,659

UNITED STATES PATENT OFFICE.

GEORGE J. FAYETTE AND JAMES S. ROLPH, OF BLAINE, WASHINGTON.

LINK SHACKLE.

Application filed August 8, 1928. Serial No. 298,156.

Our invention relates to improvements in link shackles, and has for an object to provide a line connection for hauling cables which may be released when under load strain.

Another object of our invention is to provide a hitching connection for cables which may be released when under load strain.

Another object of our improvement is to provide a cable connection which is releasable by revolving a jack screw forming a part thereof.

Another object of our improvement is to provide a cable connection having jack-screw releasing means in which said screw is also used for keeping means.

Another object of our improvement is to provide a link shackle in which the load strain is resisted by rigid parts thereof.

A further object of our improvement is to provide a link shackle of simple and strong design and easy to operate.

Other objects of our improvement will appear as the description proceeds.

We attain these and other objects of our improvement with the mechanism illustrated in the accompanying sheet of drawings in which Figure 1 is an upper edge view of our link shackle, Fig. 2 is a side elevation of our shackle, Fig. 3 is a side elevation of the shackle released for re-engagement or for fully opening, and Fig. 4 is a plan view of the jack nut.

Similar characters refer to similar parts throughout. Certain parts are broken away to show others hidden thereby.

With more particular reference to the designated parts: The frame parts of the shackle are a base hook, a keeper hook and a back link. The base hook consists of shank 5, hook 6, ear 7 and enlarged shank end 8. Bore 9 in enlargement 8 has key slot 10 and is of reduced diameter at 11 where it penetrates one side of the shank. The keeper hook has shank 12, hook 13, ear 14, and the end of shank 12 has a central tapped hole $a^{12}$ therein. Back link 15 has slotted ends to engage with ears 7 and 14 to which it is pivoted in hinge relation by pins 16, 16 through said slotted ends and said ears.

Jack screw 17 has a shank of reduced diameter at 18 which is extended through washer 22 and hole 11 before it is welded in head 19. The lower end of the screw has a shoulder which bears on washer 22 and said washer bears on the bottom of larger bore 9.

Jack screw nut 20 has its feather 21 engaged in key slot 10 and its threaded hole engaged on jack screw 17, and when said shackle is closed, said nut bears on washer 22, as in Fig. 2; but when said shackle is open, said nut is flush with the upper surface of enlargement 8, as shown at 20' in Fig. 3.

Jack screw 17 is engageable with tapped hole $a^{12}$ in keeper shank 12 and is fully extended therein when the shackle is closed as in Fig. 2, but is disengaged therefrom when the shackle is open as in Fig. 3. Jack and keeper screw 17 is revoluble by head 19.

In Fig. 2 the shackle is closed and it may be assumed that links or eyes of the line of which it would then form a part are engaged with hooks 6 and 13. Keeper screw 17 is fully extended in shank 12 and the lower end of said shank is engaged in bore 9 with its end adjacent nut 20 and its outer surface bearing on the outer wall of said bore when the shackle is under load strain.

By revolving head 19 backwards keeper screw 17 forces shank 12 upward in bore 9 till the screw is disengaged therefrom. This disengagement occurs before the shank end is disengaged from said bore because, as shown and stated above, screw 17 does not extend as far as the upper surface of enlargement 8. But as said backward revolution of screw 17 continues nut 20 continues to rise beneath the lower end of shank 12 and completes the ejection of the shank end from bore 9 till it occupies its position at 12' in Fig. 3 and is free to swing outward on pin 16 in the dotted arc shown in Fig. 3, when it is fully open for disengagement with the eye with which it was assumed to be engaged, or for engagement with another.

When the parts are in the related positions shown in Fig. 3 shank 12 is so nearly aligned with screw 17 that when said screw is turned forward nut 20 is withdrawn into bore 9 and screw 17 enters said shank tap becomes engaged therewith and the continued revolution of the screw forward will draw the shank and nut within the bore till the parts are in the related positions shown in Fig. 2 and again ready for operative strains.

There are two apparent reasons why it is desirable to have the end of screw 17 below the top surface of enlargement 8, viz, when shank 12 is released from engagement with shank 5 under load strain the forced departure of the end of the shank would injure the tread on the end of screw 17 were it in the path of said shank movement, and the entry of the end of the shank into bore 9 before screw 17 enters the tap therein allows the shank tap $a^{12}$ to come more nearly in line with the screw 17 before engagement begins.

The shackle joint provided by back link 15 allows shank 12 to be nearly aligned with screw 17 when the lower end of the shank bears on nut 20 as in Fig. 3. A single hinge joint in this part of the link would not so well assure this alignment.

Having thus disclosed our invention, what we claim as new therein and desire to secure by Letters Patent is,—

1. In a link shackle having engageable ends articulate in a hinge joint, a jack screw engaged for revolution only in one of said link ends and engageable in screw relation in the other of said link ends, and a jack-screw nut through which said jack screw is extended engaged for reciprocation only in said one of said link ends.

2. In a link shackle having engageable ends operable in a shackle-link hinge joint, a jack screw engaged for revolution only in one of said link ends and engageable in screw relation in the other of said link ends, and a jack-screw nut through which said jack screw is extended engaged for reciprocation only in said one of said link ends.

3. A shackle link consisting of a base hook having lateral concentric communicating bores of larger and smaller diameters in the end of the shank thereof said larger bore having a key slot in the wall thereof, an ear having a hole therethrough on the end of said base hook, a keeper hook having a central longitudinal tapped hole in the end of the shank thereof, an ear having a hole therethrough on the end of the hook of said keeper hook, a back link having slotted ends with holes through the walls thereof engageable with said hook ears, pins extended through said holes in said slot walls and in said ears when engaged, a jack screw having a shank of reduced diameter mounted for revolution only in said smaller bore, a jack screw nut engaged with said jack screw in said larger bore, and a feather on said jack-screw nut engaged for reciprocation in said key slot, said keeper hook shank engageable in said larger bore by the articulation of said hooks with said back link and said screw also engageable in screw relation with the said tapped hole in the end of the shank of said keeper hook.

GEORGE J. FAYETTE.
JAMES S. ROLPH.